United States Patent [19]

Takenaga

[11] 4,190,992
[45] Mar. 4, 1980

[54] SPIRAL STAIRCASE

[76] Inventor: Senzo Takenaga, c/o Akebono Kikai Kabushiki Kaisha, Taura Minato-machi, Yokosuka-shi, Kanagawa-ken, Japan

[21] Appl. No.: 943,120

[22] Filed: Sep. 18, 1978

[30] Foreign Application Priority Data

Apr. 20, 1978 [JP] Japan .................................. 53/45876

[51] Int. Cl.$^2$ ............................................ E04F 11/00
[52] U.S. Cl. ..................................... 52/187; 182/187; 248/219.4; 403/234; 403/237
[58] Field of Search .......................... 52/187; 182/187; 248/219.1, 219.4; 403/191, 234, 237

[56] References Cited

U.S. PATENT DOCUMENTS

| 340,338 | 4/1886 | Marshall | 52/187 |
|---|---|---|---|
| 575,851 | 1/1897 | Sly | 182/187 X |
| 1,547,254 | 7/1925 | McClure | 52/187 |
| 2,060,953 | 11/1936 | Strom | 182/187 |

FOREIGN PATENT DOCUMENTS

| 1056352 | 4/1959 | Fed. Rep. of Germany | 52/187 |
|---|---|---|---|
| 368920 | 12/1906 | France | 182/187 |
| 1581069 | 8/1969 | France | 52/187 |

Primary Examiner—Alfred C. Perham
Attorney, Agent, or Firm—Thomas R. Morrison

[57] ABSTRACT

This invention relates to improvements in or relating to outdoor spiral stairs comprising a column of galvanized pipe, a plurality of footstep means fixed with the column to a spiral direction and supporting means having a U-shaped bolt and nuts. Unlike the conventional welding and drilling method, a plurality of footstep means are firmly fixed with the column by clamping the supporting means by the U-shaped bolt and nuts.

7 Claims, 6 Drawing Figures

SPIRAL STAIRCASE

BACKGROUND OF THE INVENTION

This invention relates to improvements in or relating to outdoor spiral stairs. Conventionally, a plurality of footstep means for outdoor spiral stairs are jointed to a column by welding to a spiral direction. Since a welding work has been required normally, both an assembling work of the footstep means and the welding work of a plurality of footstep means with the column have been done in a manufacturing plant.

Accordingly, it is extremely inconvenient and cumbersome to transport a plurality of footstep means jointed to the column to a certain construction site where they should be erected. Needless to say, a big-scale truck and other lifting means are needed for its transportation. This is burdensome and expensive.

Normally, those footstep means and the column are painted in order to prevent their corrosion. Therefore, every several years the painting work is needed, and its maintenance cost is added.

For the sake of overcoming the foregoing disadvantages of the conventional art, the present invention has been achieved.

BRIEF SUMMARY OF THE INVENTION

Accordingly, it is an object of this invention to provide outdoor spiral stairs comprising a column of galvanized pipe, a plurality of footstep means fixed with the column to a spiral direction and supporting means having a U-shaped bolt and nuts, whereby a plurality of footstep means are firmly fixed with the column by clamping the supporting means by the U-shaped bolt and nuts.

It is another object of this invention to provide outdoor spiral stairs, wherein the column, each footstep means and the supporting means are separated from each other, thus respective means being able to be transported easily to a construction site.

It is another object of this invention to provide outdoor spiral stairs, wherein on the underside of the footstep means there are mounted a plurality of reinforcing plates in order to enhance the strength of the footstep means furthermore.

It is a further object of this invention to provide outdoor spiral stairs which is very easy in assembling.

It is still further object of this invention to provide outdoor spiral stairs of which production cost is inexpensive.

Other and further objects, features and advantages of this invention will be apparent from the following description taken in connection with the accompanying drawings.

DETAILED DESCRIPTION OF THE INVENTION

Figure 1:
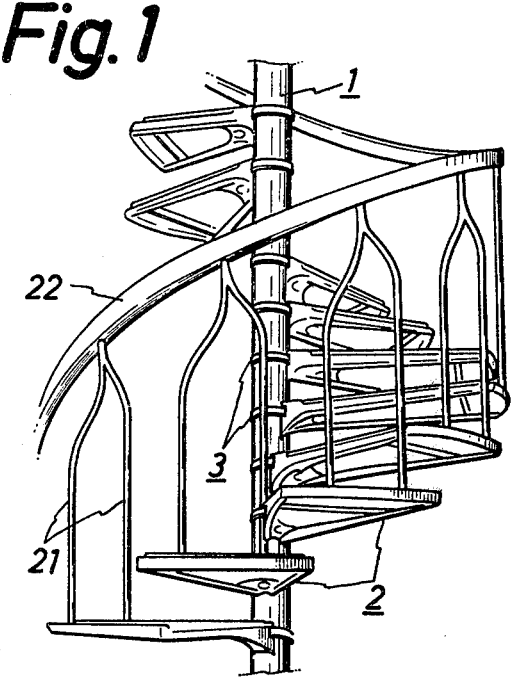
FIG. 1 is a perspective view of outdoor spiral stairs according to this invention.

In FIG. 1 there are erected a plurality of footstep means for outdoor spiral stairs.

Numeral 1 is a column for the outdoor spiral stairs which is made of a galvanized gas pipe and numeral 2 is one of a plurality of footstep means fixed with the column by clamping a supporting means 3 which will be described hereinafter in detail.

The footstep means 2 manufactured by a press work includes a fan-shaped flattened upper surface 4, two side walls 5, a base portion 6 and two undersides 9 which were made by bending inwardly one portion of the side wall 5. The widest portion 7, i.e. an end of the upper surface 4 has a verge 8.

On the bottom of the base portion 6 there is mounted a reinforcing plate 10 in order to prevent bending of the side walls 5 adjacent the base portion 6.

The base portion 6 has a curved face 12a so as to contact closely with the curved circumference of the column 1. Likewise, one end of the reinforcing plate 10 has a curved face 12b. Inside the base portion 6 there is mounted a supporting plate 13 in order to reinforce the footstep means 2. Further, in order to support the supporting plate 13, a bar 14 is bridged obliquely.

All the surfaces of the footstep means 2 are galvanized to prevent corrosion. The footstep means 2 is secured to and fixed with the column 1 by means of the supporting means comprising a resilient band-type support 15, a U-shaped bolt 16 engaged with the band-type support 15 and incorporated into the base portion 6, and nuts 19 engaged with the U-shaped bolt 16.

Figure 4A:
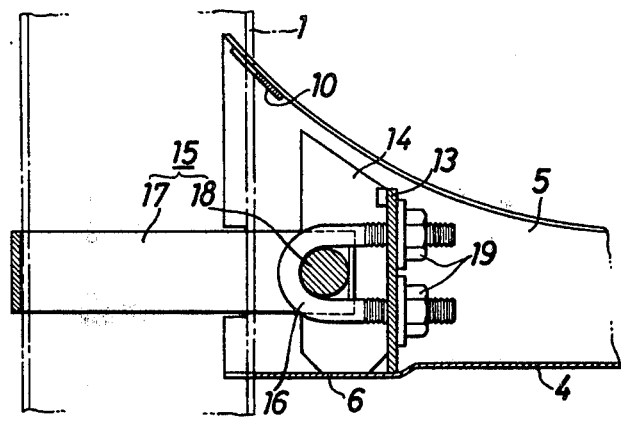
FIG. 4a is a partially cutaway sectional side view of the main part of FIG. 3, which is substantially taken along the lines IVa—IVa of FIG. 4b.
Figure 4B:
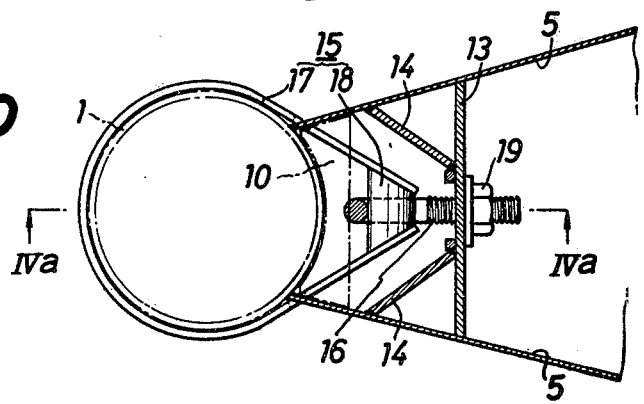
FIG. 4b is a partially cutaway sectional plan view of the main part of FIG. 3.
Figure 2:
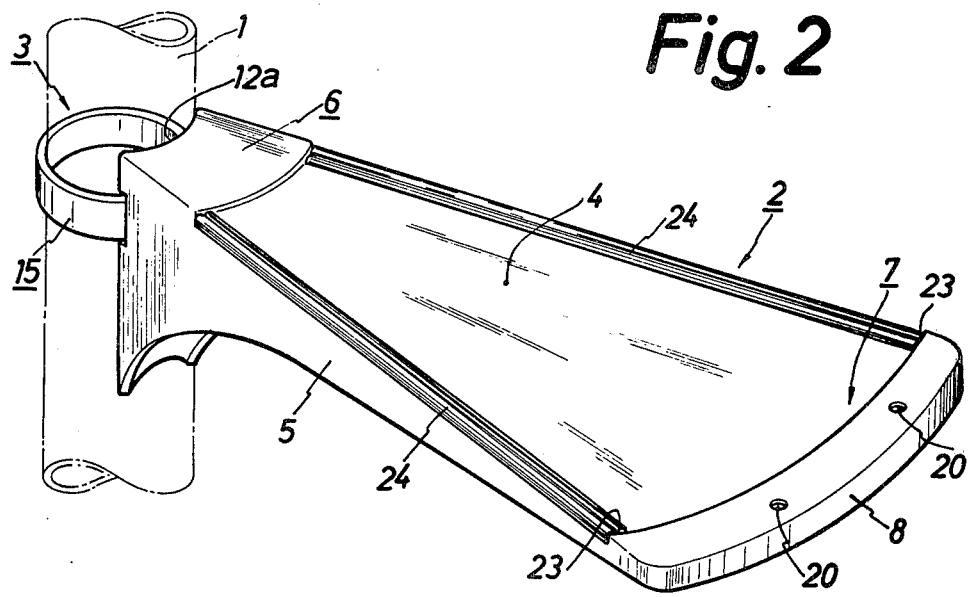
FIG. 2 is a perspective upper view of a unit of footstep means in the arrangement in FIG. 1.

FIGS. 4a and 4b show the conditions of the foregoing fixation. The band-type support 15 consists of a band-type support member 17 and a pin 18. And two ends of the band-type support member 17 are linked with each other by the pin 18 as shown in FIG. 4b. The pin 18 is engaged with a curved portion of the U-shaped bolt 16 as shown in FIG. 4a. The U-shaped bolt 16 is fixed with the supporting plate 13 by nuts 19, thereby the footstep means 2 being secured to the column 1. By clamping the nuts 19 to a certain degree, a sufficient clamping power is obtained, i.e. the footstep means 2 is firmly with the column 1.

There are formed threads holes 20 at one side 7 of the footstep means 2 whereby a pair of stands 21 connected to a handrail 22 are erected on the side portion 7 by being fixed into the thread holes 20.

Figure 3:
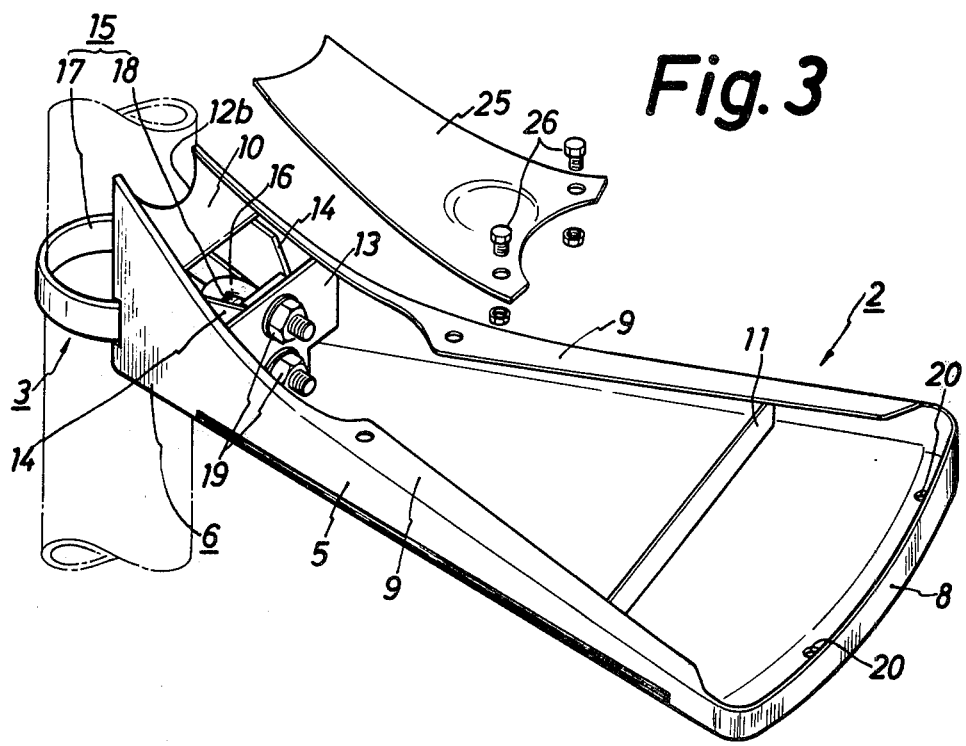
FIG. 3 is a perspective bottom view of the footstep means in FIG. 2.

The area of the U-shaped bolt 16 and of the supporting plate 13 is covered by a cover plate 25 as shown in FIG. 3. The cover plate 25 is to be fixed with the undersides 9 by a preferred number of screws 26.

Further, there is formed a L-shaped recess 23 at both edges of the upper surface 4, wherein a L-shaped non-slip member 24 is firmly inserted in the L-shaped recess 23 by a known art.

Figure 5:
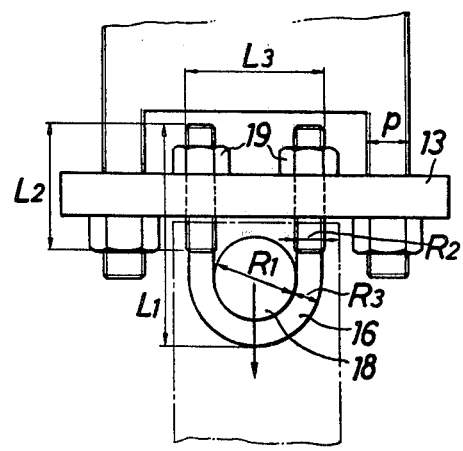
FIG. 5 is a plan view showing a tensile strength test of a U-shaped bolt in the arrangement of FIG. 1.

FIG. 5 shows a plan view showing a tensile strength test of the U-shaped bolt which was executed by the Public Industrial Test Center of Kanagawa Prefecture, Japan. An arrow shows a tensile direction. At that time, three test pieces were used for testing. The result was that the three respective test pieces can resist the strength of 14,480 kg, 14,575 kg and 14,575 kg respectively. Accordingly, it has been confirmed that only one unit of the U-shaped bolt has a sufficient mechanical strength.

The main dimensions of means provided for the above tensile strength are as follows.

$L_1 = 105$ mm
$L_2 = 55$ mm
$L_3 = 60$ mm
$P = 19$ mm
$R_1 = 28$ mm
$R_2 = 15.2$ mm
$R_3 = 14$ mm

As mentioned above, the outdoor spiral stairs according to the invention is very easy in assembling and transportation. Unlike the conventional welding or drilling method, the footstep means is fixed with the column by clamping the supporting means by the U-shaped bolt and nuts, in other words, by use of a friction force.

In addition, since the column, each footstep means and supporting means are separated from each other, it is very easy to transport them to a construction site. The best material of the column is a galvanized gas pipe which is commercially used. In case of a high spiral stairs, it is easy to joint a necessary number of columns with each other.

According to another aspect of this invention, on the underside of the footstep means there are mounted a plurality of reinforcing plates in order to enhance the strength of the footstep means furthermore.

It is further understood by those skilled in the art that the foregoing description is a preferred embodiment of the disclosed device and that various changes and modifications may be made in the invention without departing from the spirit and scope thereof.

What is claimed is:

1. A spiral staircase comprising a column of pipe, a plurality of footstep means fixed to the column in a spiral array, supporting means having a U-shaped bolt and nuts, whereby a plurality of footstep means are firmly fixed to the column by clamping the supporting means by the U-shaped bolt and the nuts, said supporting means including a band-shaped support encircling the column, said U-shaped bolt engaging a pin of the band-shaped support and said nuts clamping the U-shaped bolt on a supporting plate of the footstep means.

2. A spiral staircase according to claim 1, wherein each footstep means and the supporting means are galvanized.

3. A spiral staircase according to claim 1, including a plurality of reinforcing plates mounted longitudinally on the underside of said footstep means for enhancing strength of said footstep means.

4. A spiral staircase comprising a column, a plurality of footstep means anchored to the column in a spiral array by individual supporting means, each supporting means having a band-type support encircling said column and a U-shaped bolt and nuts for securing said column to said footstep means, said band-type support engaging said U-shaped bolt and being fixed to said column by tightening said U-shaped bolt and nuts on said footstep means.

5. A spiral staircase according to claim 4, wherein all the surfaces of said column, each said footstep means and said supporting means are galvanized.

6. A spiral staircase according to claim 4 or 5, wherein said U-shaped bolt is engaged with a pin of said band-shaped support and two of said nuts fasten said U-shaped bolt to a supporting plate of said footstep means.

7. A spiral staircase according to claim 4 or 5, wherein a plurality of stiffening means are mounted on said footstep means for enhancing the mechanical strength of said footstep means.

* * * * *